W. O. KENNINGTON.
COUPLING FOR SHAFTING.
APPLICATION FILED OCT. 10, 1911.
1,034,249.
Patented July 30, 1912.
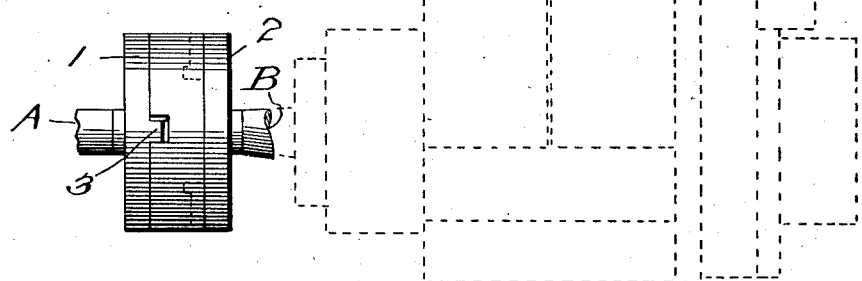
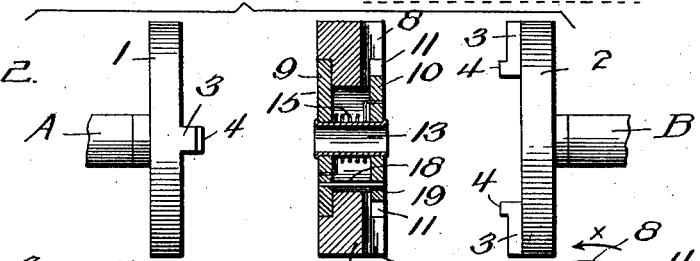
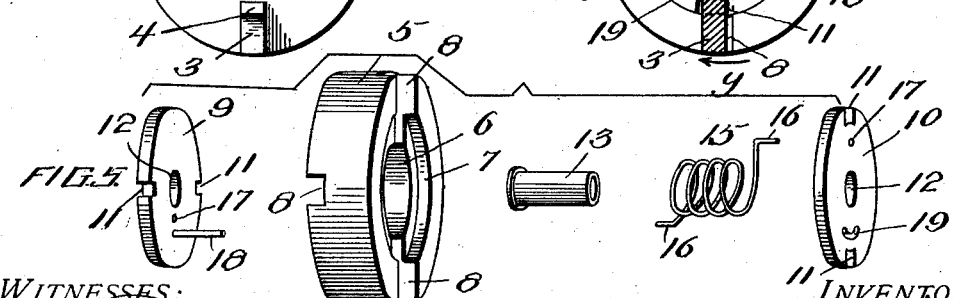
WITNESSES:
W. F. Coyle
R. E. Barry
INVENTOR
William O. Kennington
BY
Whitaker Prevost
Attorneys

UNITED STATES PATENT OFFICE.

WILLIAM O. KENNINGTON, OF BLOOMFIELD, NEW JERSEY, ASSIGNOR TO THE SIMMS MAGNETO CO., INC., OF NEW YORK, N. Y., A CORPORATION OF NEW YORK.

COUPLING FOR SHAFTING.

1,034,249.  Specification of Letters Patent.  Patented July 30, 1912.

Application filed October 10, 1911. Serial No. 653,973.

*To all whom it may concern:*

Be it known that I, WILLIAM O. KENNINGTON, a citizen of London, England, residing at Bloomfield, in the county of Essex and State of New Jersey, have invented certain new and useful Improvements in Couplings for Shafting; and I do hereby declare the following to be a full, clear, and exact description of the invention, such as will enable others skilled in the art to which it appertains to make and use the same.

My invention consists in the novel features hereinafter described reference being had to the accompanying drawing, which shows one form or embodiment of the invention which I have selected for purposes of illustration and the said invention is fully disclosed in the following description and claims.

The object of my invention is to provide a coupling for shafts which will insure the proper connection between them even though they should not be in absolutely axial alinement, the construction being such that parts capable of a slight yielding movement are inserted between the driving members so that a slight yield of the engaged parts is permitted when the coupling is rotated in one direction, and which when the coupling is rotated in the opposite direction and in fact at all times when the device is in operation, holds the parts against back-lash and renders the operation of the device noiseless. This coupling is especially desirable for connecting the magneto furnishing current to the spark plugs of an internal combustion engine, with the driving shaft on the engine designed for operating the magneto, as for example in automobiles, where it is difficult to secure or maintain an absolute axial alinement of the driving shaft with the armature shaft of the magneto. I do not, however, limit myself to this use of the improved coupling, as the same may be used for other purposes.

Referring to the drawing, Figure 1 is an elevation of an embodiment of my invention as applied to the connection between a driving shaft and a magneto, the magneto being indicated in dotted lines. Fig. 2 represents the three parts of the coupling separated, the central part or coupling ring being shown in section. Fig. 3 is a face view of one of the coupling disks. Fig. 4 is a side elevation of the coupling ring, the positions of the coupling lugs or projections of the adjacent coupling disk being indicated in section. Fig. 5 is a detail view showing the parts of the intermediate coupling ring separated from each other.

In the drawings A represents, in the embodiment of the invention which I have selected for purposes of illustration, a driving shaft which is to be connected to the shaft B of a magneto electric machine, by my improved coupling. The coupling comprises three parts ordinarily, to wit, two coupling disks 1 and 2, each of which is preferably provided with suitable means for connecting it to one of said shafts. In the present instance, each disk is shown as provided with a central threaded aperture 1ª which is screwed on the shaft. The disks may, however, be connected to the shaft by keys or in any other desired way. Each disk is provided with one or more, and preferably two, coupling lugs or projections 3, 3 which are disposed radially on the inner face of the disk and each of said lugs or projections is provided near its inner end with a heel piece 4 extending still farther from the face of the disk. Between these opposed disks is located the third member of the coupling, which I term the intermediate coupling ring. This ring, as best seen in Fig. 5, is provided on each face with an annular recess 7 surrounding its central aperture 6 and each face of the ring is also provided with one or more, and preferably two, radial notches 8. On each side of the ring 5 is located a circular plate lying in the annular recess 7, said plates being indicated at 9 and 10. Each of these plates is provided with peripheral notches 11, 11 adapted to be brought into registration with the notches 8 in the adjacent face of the ring 5 and each of said plates is connected with a spring which normally tends to hold the plate in such a position that the notches 11 thereof are not in registration with the corresponding notches of the ring. I prefer to employ a single spring 15 of spiral form having its ends 16 engaging apertures 17 in the plates 9 and 10 and for the purpose of assembling the parts of the intermediate coupling ring I have shown a hollow rivet 13 which passes through the plates 9 and 10 to hold them in engagement with the ring.
I may, however, secure them in position in the ring in other ways. For convenience in assembling the various parts of the coupling, I prefer to provide means for limiting the relative rotation of the plates 9 and 10 and to this end I have shown a pin 18 secured to one of said plates, in this instance the plate 9, and engaging a segmental slot 19 in the other of said plates to wit, the plate 10.

It is to be understood that the heel portions or extensions 4 of the coupling projection 3 on the disks 1 and 2, are so located that they may be made to engage with the notches 11, 11 of the plates 9 and 10, so that said heel portions may be placed in engagement with the notches 11, 11 and by rotating the shafts very slightly with respect to each other, the plates 9 and 10 can be slightly rotated relatively so as to bring the notches 11, 11 in alinement with the notches 8, 8 of the intermediate coupling ring, when the disks 1 and 2 can be pressed together upon the coupling ring 5 causing the remaining portions of the lugs 3, 3 to seat themselves in the notches 8 as indicated in Fig. 1 and also in Fig. 4. The notches 8 are made wider than the lugs 3 so as to allow for slight variations in the alinement of the shafts to be connected without causing the lugs to bind in said notches. The parts being thus engaged, if the driving shaft A, for example, is caused to rotate in the direction of the arrow $x$, in Fig. 4, it will be seen that the pressure of the driving lugs 3, 3 will be first exerted upon the plate 10 through the notches 11, 11 thereof, thus tending to compress the spring 15 and providing for a slight yield of the parts in case the resistance to the rotation of the driving shaft is greater than the tension of the spring 15, as for example, in starting and before the driven part has acquired momentum. The action of this spring provides an easy starting movement and in case of light driving devices, it will frequently happen that the entire drive will be against the resistance of the spring, the parts remaining in the position shown in Fig. 4, except perhaps in starting, or in case an additional load is placed on the driven part.

If the shaft A is driven in the direction indicated by the arrow $y$ in Fig. 4, it will be seen that the lugs 3, 3 will directly engage the walls of the notches 8 and positively drive the intermediate coupling ring 5, which in turn communicates its motion to the other disk and shaft B. In this case the spring actuated plates 9 and 10 simply act by the engagement of their notched portions with the lugs 3, 3 of the disks, and by virtue of the spring 15, to prevent backlash and thus make the operation of the device noiseless. It should be stated that the notches 8 on the opposite faces of the ring 5 are arranged in lines at right angles to each other in a well known way, so that the intermediate coupling ring is prevented from accidental disengagement from the disks 1 and 2.

I have found this coupling very advantageous in connecting magnetos with a driving shaft from the engine, the ignition devices of which are operatively connected with the magneto, especially in automobiles and other vehicles where it is difficult to obtain an exact alinement of the driving shaft with the shaft of the armature of the magneto. This coupling will provide an efficient driving connection between the two parts under all conditions and even if the position of the magneto is or becomes such as to place its armature shaft at a slight angle to the driving shaft. The coupling operates without noise under all conditions and when used under the conditions hereinbefore described with reference to the direction of rotation indicated by the arrow $x$ in Fig. 4, it provides a slight yield between the driving and driven parts to take up sudden shocks and insure easy starting.

What I claim and desire to secure by Letters Patent is:—

1. In a shaft coupling, the combination with a coupling disk, provided with a coupling projection extending from one of its faces, of a coupling ring, provided with a recess in one of its faces to loosely receive said projection, a circular part carried by said ring and provided with a recess adapted to be brought into registration with the said recess in the ring, said circular part being movable in respect to the ring in a rotary direction, a spring connected with said circular part and normally holding its recess out of registration with the recess in the ring, and means for connecting said ring with the other of the shafts to be coupled.

2. In a shaft coupling, the combination with the coupling disks each provided with means for attaching it to one of the shafts to be connected, and having on one face a plurality of coupling projections, of an intermediate coupling ring, provided on each of its lateral faces with notches to receive said coupling projections of the adjacent disks, and a circular plate on each of the lateral faces of said ring movable with respect to the ring in a rotary direction and provided with peripheral notches adapted to register with the adjacent notches in the ring, and a spring connected to each of said plates and normally holding the notches thereof out of registration with the notches of the ring.

3. In a shaft coupling, the combination with the coupling disks each provided with means for attaching it to one of the shafts to be connected, and having on one face a plurality of coupling projections, of an intermediate coupling ring, provided on each of its lateral faces with notches to receive said coupling projections of the adjacent disk, and a circular plate on each of the lateral faces of said ring movable with respect to the ring in a rotary direction and provided with peripheral notches adapted to register with the adjacent notches in the ring, a spring connected to each of said plates, and means for limiting the relative rotation of said plates.

4. In a shaft coupling, the combination with the coupling disks, each provided with means for attaching it to one of the shafts to be connected, and having on one face a plurality of coupling projections, of an intermediate coupling ring provided on each of its lateral faces with notches to receive said coupling projections of the adjacent disk, and a circular plate on each of the lateral faces of said ring movable with respect to the ring in a rotary direction and provided with peripheral notches adapted to register with the adjacent notches in the ring, a spring connected to each of said plates and a stud connected to one of said plates and engaging a slot in the other of said plates.

5. In a shaft coupling, the combination with the coupling disks, each provided with radially disposed coupling projections, each of said projections having a heel portion projecting farther from the face of the disk than the other portions, of an intermediate coupling ring provided on its opposite faces with radial notches to loosely engage said projections, circular plates located on opposite faces of said ring and provided with peripheral notches to engage the heel portions of said projections, and a spring connected with said plates, and holding the notches thereof out of registration with the notches of the ring.

6. In a shaft coupling, the combination with the coupling disks each provided with radially disposed coupling projections, each of said projections having a heel portion projecting farther from the face of the disk than the other portions, of an intermediate coupling ring provided on its opposite faces with radial notches to loosely engage said projections, circular plates located on opposite faces of said ring and provided with peripheral notches to engage the heel portions of said projections, a spiral spring having its opposite ends connected with said plates, means for securing said plates permanently to the ring, and a stud connected with one of said plates and engaging a curved slot in the other of said plates.

In testimony whereof I affix my signature, in the presence of two witnesses.

WILLIAM O. KENNINGTON.

Witnesses:
ROGER H. BUTTERWORTH,
JULIUS EHMANN.

---

Copies of this patent may be obtained for five cents each, by addressing the "Commissioner of Patents, Washington, D. C."